April 13, 1965
A. A. ROOD
3,177,599
PILOT OPERATED HYDRAULIC CONTROL SYSTEM FOR SCRAPERS
Filed Sept. 28, 1962
3 Sheets-Sheet 1
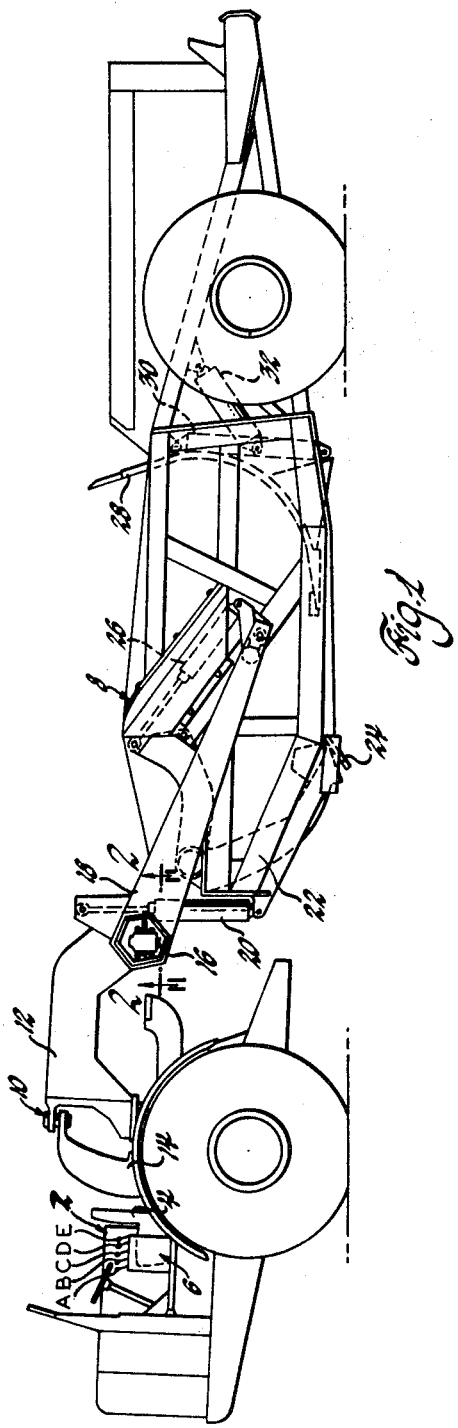
INVENTOR.
*Alvin A. Rood*
BY
*Paul J. Reising*
ATTORNEY

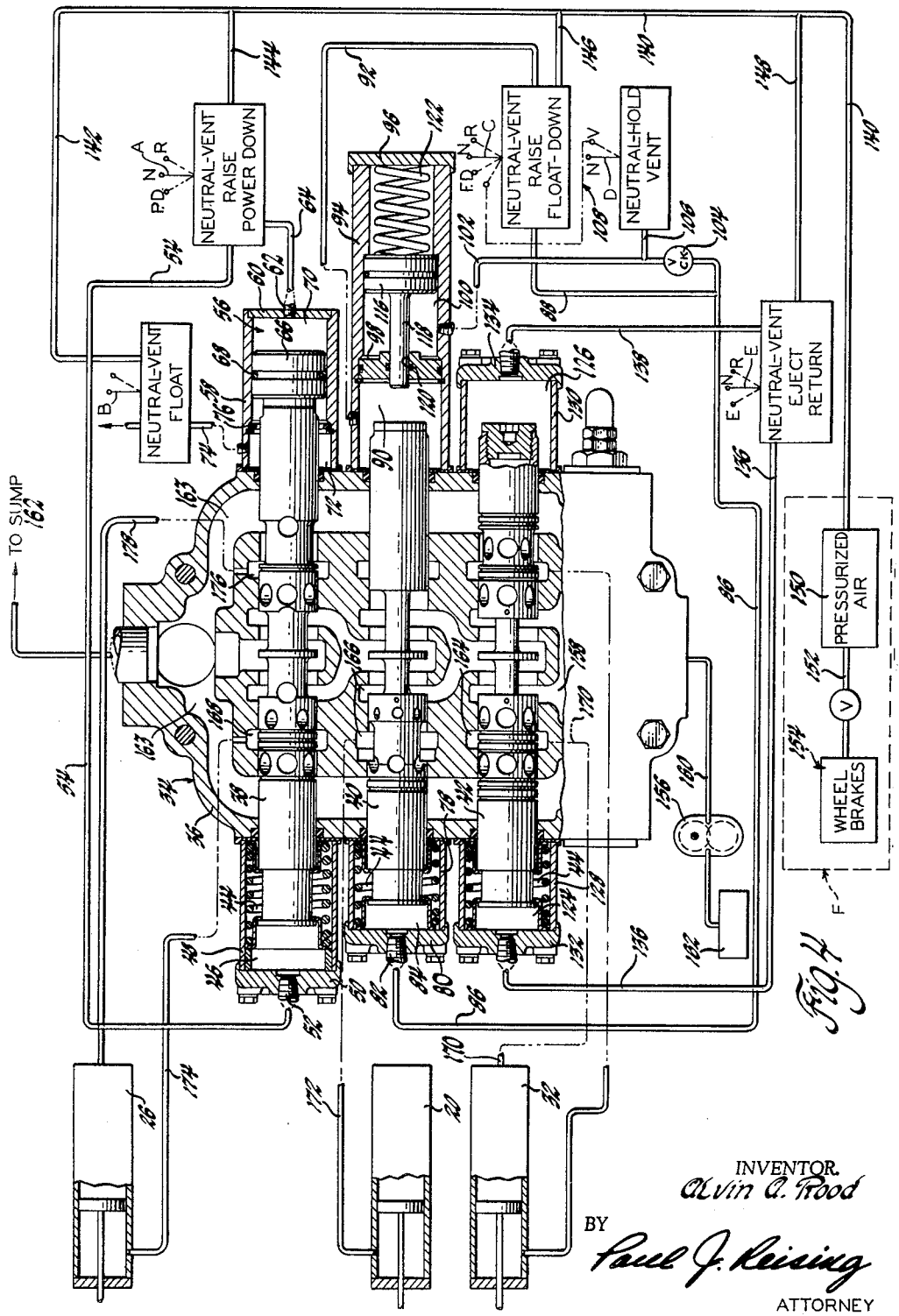

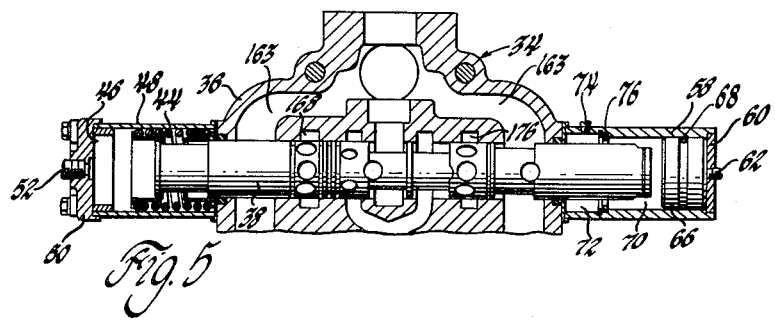
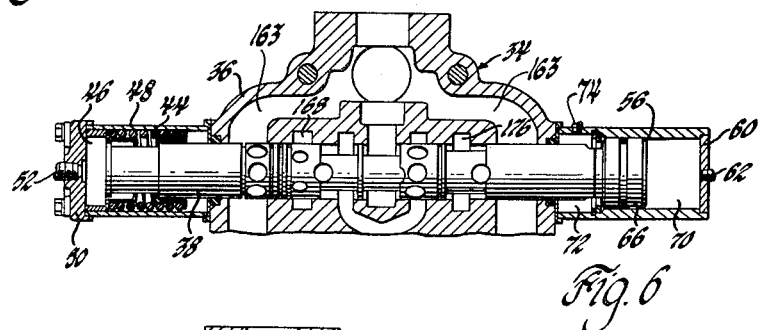
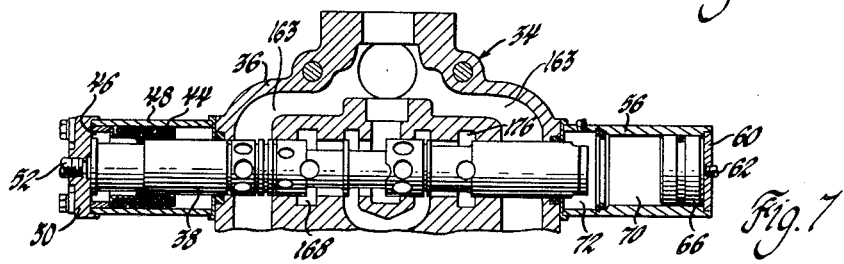
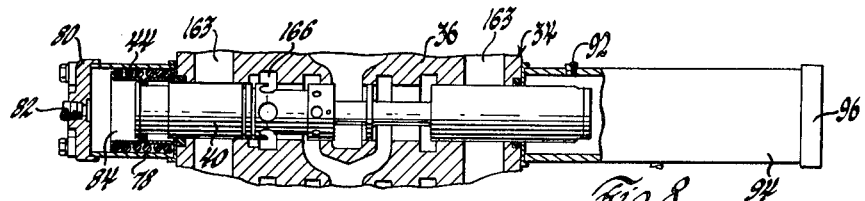
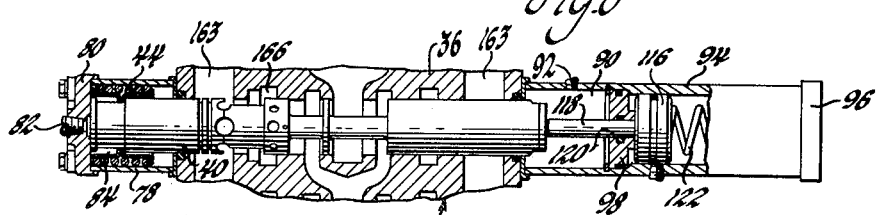

United States Patent Office 3,177,599
Patented Apr. 13, 1965

3,177,599
PILOT OPERATED HYDRAULIC CONTROL
SYSTEM FOR SCRAPERS
Alvin A. Rood, Willoughby, Ohio, assignor to General
Motors Corporation, Detroit, Mich., a corporation of
Delaware
Filed Sept. 28, 1962, Ser. No. 227,012
10 Claims. (Cl. 37—129)

This invention pertains to a pneumatically remotely located valving mechanism for controlling the fluid flow to and from the hydraulic jacks connected to the bowl, apron, and ejector of a scraper.

The present practice in scraper design has been to place the valve mechanism which controls fluid flow to and from the several operating jacks of the scraper components, such as the bowl, apron, and ejector, on the tractor portion of the scraper unit. This has required numerous high and low pressure conduits to extend from the valve mechanism back across the draw bar and along a considerable length of the scraper bowl for connection to the various jacks, and therefore has made it extremely difficult to quickly disconnect or attach the tractor to the bowl portion of the scraper when it becomes necessary to do so.

The present invention contemplates an arrangement which enables the valve mechanism and other hydraulic components to be located on the draw bar or bowl more closely adjacent to the jacks so as to eliminate the need for running the aforementioned hydraulic lines between the tractor and scraper bowl. This is accomplished by combining the valve mechanism with the air brake system of the vehicle so that the pressurized air of the latter can be utilized for positively positioning the spool valves of the valve mechanism to obtain the desired movement of the associated jacks. An air selector mechanism incorporating appropriate means is mounted on the tractor between the valve mechanism and the air brake system for supplying air to the valve mechanism to selectively position the various spool valves and accordingly the associated jacks. The valve mechanism employs air-operated means that permit the apron spool valve to assume two operating positions, a hold position, and a float position with the bowl spool valve capable of assuming an operating, hold, and float position while the ejector has two operating positions and a hold position. Moreover, the bowl spool valve is incorporated with an air-operated piston so that in the event of air brake pressure failure a movement of the bowl control portion of the lever mechanism to the down position causes the bowl spool valve to automatically shift to a float position and thereby cause the bowl to drop to a dig position resulting in a braking of the scraper.

Other features and advantages of this invention will become more apparent from a perusal of the detailed description taken in conjunction with the following drawings in which:

FIGURE 1 is a scraper unit incorporating the subject invention,

FIGURE 2 is a view taken on lines 2—2 of FIGURE 1,

FIGURE 3 is an enlarged perspective view of the air selector mechanism which is positioned adjacent the vehicle operator, FIGURE 4 is a detail view partly in section of the valve mechanism combined with a schematic of the hydraulic and air brake system, FIGURES 5, 6, 7, 8 and 9 show the spool valves of the valving mechanism of FIGURE 4 in different operating positions.

Referring to FIG. 1, a scraper is shown incorporating the present invention and comprising an over-hung tractor 2 having an operator's station 4 including an air selector mechanism 6 provided for operating the various components of the scraper. The tractor is connected to a bowl 8 by a hitch arrangement 10 which includes a draw bar 12 having vertically-spaced pivots for connection with a stanchion 14 rigidly mounted to the tractor. Although not apparent from the view of FIG. 1, the draw bar 12 consists of a pair of rearwardly diverging arms which are rigidly connected to a transversely extending torque tube 16 which in turn, carries a pair of rearwardly extending pull arms 18. The free end of each pull arm 18 supports the bowl 8 for pivotal movement about a horizontal transverse axis which movement is governed by a single acting hydraulic jack 20 pivotally mounted between the bowl and a bracket extending upwardly from the torque tube. The arrangement is such that upon pressurization of the upper end of jack 20, the latter contracts to raise the bowl to a carry position conversely, when the upper end of the jack is vented the bowl drops by gravity into engagement with the ground and to a digging position.

An arcuately shaped apron 22 is pivotally mounted to the forward end of the bowl side wall for opening and closing the mouth of the bowl in cooperation with a transversely extending cutting edge 24 rigidly fixed to the floor of the bowl. A double-acting jack 26 is pivotally mounted between the terminal end of a pull arm and an extension of the apron for power opening and closing the latter during the work cycle of the scraper. In the rear portion of the bowl, an arcuate ejector 28 extends transversely between the bowl side walls and is operatively connected to one end of a lever 30. The other end of the lever is pivotally supported by the superstructure of the bowl and has an intermediate portion connected to a hydraulic jack 32 which moves the ejector forwardly in discharging a load from the bowl. As in the case of the apron jack, the jack 32 is of a double-acting type so that the ejector is moved in a forward or rearward direction under power.

Thus, from the above description it should be apparent that the scraper unit has the bowl 8, apron 22 and ejector 28 operated by hydraulic jacks, and although not shown in FIG. 1, appropriate hydraulic lines connect each of the jacks with a control unit or valve mechanism 34 secured to one end of the torque tube 16. As will be described more fully hereinafter, the control unit has the usual spool valves therein which are selectively moved in response to actuation of the remotely located levers mounted in the air selector mechanism 6 on the tractor 2.

FIG. 4 shows the control unit or valving mechanism 34 in detail and operatively combined with the various jacks used for operating the scraper components. More specifically, the control unit 34 comprises a housing 36 that includes three reciprocable spool valves 38, 40, and 42, which are respectively connected through appropriate porting and conduits to the apron jack 26, the bowl jack 20, and the ejector jack 32. Each of the spool valves are associated with the usual porting formed in the housing 36 so that appropriate positioning of a respective spool valve results in flow of hydraulic fluid to and from one of the jacks to control the device connected thereto. Also, each of these spools is similar, in having, as illustrated in the drawing, a neutral-hold position in which fluid is locked in the associated jacks to hold the device connected thereto in any selected adjusted position. Movement of any of these spool valves to one side of neutral-hold will operate a particular device in one direction while movement of the spool valve to the other side of neutral-hold will actuate the device in the opposite direction either under power, as in the case of the apron and ejector, or by gravity, as in the case of the bowl. As will be more fully explained hereinafter, the apron spool valve differs from the other two in having a fourth position, that is, a float position similar to that of the bowl in which the apron can move to a lowered position by gravity alone. Each of these spool valves is also similar in that they include a self-centering spring mechanism 44 at one end of the housing which acts to automatically return a spool to the neutral-hold position upon release of the spool actuating mechanism.

As mentioned above, the air selector mechanism includes five air control levers which are identified in FIGS. 1 and 4 by the letters A, B, C, D, and E. Each of the levers are connected at one end to a valve which through appropriate air lines is located between a source of pressurized air such as the scraper air brake system F and one of the spool valves in the valving mechanism 34. Thus, movement of one of the levers to an operating position causes compressed air to flow from the brake system to the valving mechanism and cause corresponding movement of the associated spool valve. This will become more apparent as the description of the invention proceeds however, at this time it is important to note that levers A and B control movement of the apron spool valve 38, levers C and D the bowl spool valve 40, and lever E the ejector spool valve 42. Furthermore, the air selector mechanism is such that any of the levers must be held in an operating position for actuating the associated jack, and upon release of the lever, the latter automatically returns to neutral in which position the valve mechanism is vented.

The opposite ends of each of the spool valves 38, 40, and 42 are mounted within air chambers which are adapted to be pressurized by the air selector mechanism so as to move the associated spool valve from neutral-hold to a position for charging one side of the jack while venting the other side. More specifically the apron spool 38 has one end thereof disposed within an air chamber 46 formed by a tubular extension 48 extending from and fixed to one side of the housing 36. This chamber is closed by a cap 50 having a port 52 that is connected through a line 54 to the appropriate air selector valve controlled by the lever A. Similarly, the opposite end of the spool valve 38 is housed within an air chamber 56 which, in this instance, is defined by a tubular extension 58 and closed by a cap 60. A port 62 in cap 60 connects air chamber 56 through line 64 to the air selector valve also controlled by lever A.

A slidable piston 66 is mounted in the air chamber 56 and includes an O ring 68 for sealingly dividing the chamber into primary and secondary chambers 70 and 72. The secondary chamber 72 is adapted to be connected with pressurized air through a line 74 which leads to the air control lever B. As in the case of the air control lever A, the lever B is operatively associated with an air valve which is responsive to the movement of the lever for supplying air to the line 74 from the scraper air brake system or for venting air from chamber 72. It should be noted that movement of the piston 66 in a direction toward the spool valve 38 is limited by a stop 76 formed by an annular washer rigidly connected with the tube 58 for purposes which will be explained hereinafter.

The bowl spool valve 40 has the opposite ends thereof disposed in air chambers in a manner similar to the apron spool valve 38. It can be seen that, as viewed in FIGURE 4, the left end of the spool valve 40 is associated with a tubular extension 78 which houses the spring mechanism 44. The extension 78 is secured at one end to the housing 36 and at the other end closed by a cap 80 having a port 82 so as to form an air chamber 84 that connects through the conduits 86 and 88 to the air control lever C. The lever C, as in the case of levers A and B, operates an appropriate valve for directing air from the air brake system F to the air chamber 84 or for venting this chamber. An air chamber 90 formed on the opposite end of the bowl spool valve 40 receives air through a line 92 and is formed by a portion of a tubular extension 94 which extends from the right end of the housing 36 and is closed by a cap 96. An annular separator 98 is rigidly disposed in the tubular extension 94 so as to form an additional air chamber 100 which is connected through line 102 and check valve 104 to line 88. Check valve 104 permits air to flow from line 88 to line 102, however, prevents the air to return from the latter so that upon pressurization of chamber 90, chamber 100 is also pressurized. Additionally, line 102 is connected to line 106 which leads to the air control lever D normally in a N or neutral position and movable to a V position for venting chamber 100 for reasons which will hereinafter be explained. As shown in FIG. 3, the lever C is operatively associated with cooperating linkage 108 so that upon movement of lever C in a direction beyond position F, D, or float-down, the lever contacts a portion 110 of the linkage to shift the opposite portion 112 about the pivot point 114 and thereby moves the lever D to the V or vent position to exhaust chamber 100.

A reciprocable piston is housed within the air chamber 100 and comprises a head 116 with an elongated rod 118 connected thereto. The rod extends through a centrally formed bore 120 in the separator 98 and a coil spring 122 is positioned to one side of the piston head 116 for continuously urging the latter in a direction so as to extend the rod into the adjacent air chamber 90. Normally when the air chamber 100 is pressurized the piston assumes the retracted position, as illustrated in FIG. 4 so as to compress the spring 122 and remove the rod 118 from the air chamber 90 and thereby not interfere with any reciprocal movement of the bowl spool valve 40.

As with the apron and bowl spool valves, the ejector spool valve 42 has the opposite ends thereof positioned in air chambers 124 and 126, respectively formed by the tube extensions 128 and 130, each of which is closed by the cap members 132 and 134. Air chamber 124 is connected through air line 136 to the air control lever E, while the other air chamber 126 is connected through line 138 to the same lever. As with the air control levers associated with the apron and bowl spool valves, the lever E is connected to an air valve for selectively directing pressurized air to either air chamber 124 or 126 for purposes of moving the spool valve 42.

As alluded to hereinbefore, each of the air control levers associated with the spool valves draws low pressure air from the scraper air brake system F. The latter is connected to the air selector mechanism 6 through a main line 140 which as seen in FIG. 4 respectively connects through branch lines 142, 144, 146 and 148 to the air control levers B, A, C, and E. The scraper air brake system comprises a source of pressurized air 150 which is connected through line 152 and associated control valving to the air brake chambers of the scraper wheels generally indicated by the numeral 154. Thus, it can be seen that upon movement of any one of the levers A, B, C, or E located on the tractor, air can be supplied from the air brake system to enter one side or the other of a particular spool valve for moving the latter in a position for directing pressurized hydraulic fluid to one side or the other of one of the jacks or for moving the spool valve, as in the case of the apron and bowl, to a "float" position.

The valving mechanism 34 is charged with hydraulic fluid by an engine driven pump 156 connected to the pressurized porting 158 of the valve mechanism 34 by line 160. The pump draws fluid from a reservoir 162 and when the various valve spools are in the neutral-hold position, as illustrated in FIG. 4, the fluid passes through the valving mechanism 34 and out through the discharge porting 163 back to the reservoir 162. Of course where any of the valve spools are moved to the right of neutral-hold, as shown in FIGS. 5–7, the fluid is diverted to pressurize one of the ports 164, 166 or 168 respectively connected to one side of the ejector, bowl, and apron jacks by the lines 170, 172, and 174. Similarly, where the spool valves are moved to the left of neutral-hold, and as in the case of the apron spool valve 38, port 176 would be pressurized so as to supply hydraulic fluid via line 178 to the piston head end of the apron jack 26 to expand the latter. Simultaneously, the piston rod end of the jack 26 would be vented through line 174, port 168 and discharge port 163. The ejector spool valve 42 operates in a manner similar to the apron spool valve in that pressurization of both sides of the jack 30 can be obtained so as to have a power expansion and contraction of the jack. However, in the case of the bow jack 20, inasmuch as this jack is of the single acting type, hydraulic fluid is only directed to the jack when the spool valve 40 is moved to the right of neutral-hold as shown in FIG. 8. When moved to the left of neutral-hold, line 172, is vented through port 166 and the spool valve 40 is in a "float" position to permit the bowl 8 to move by gravity from a raised position to a digging position. The valve spools 38, 40, and 42 must be operated independently for pressurizing the associated jack. That is, only one jack can be pressurized at one time, and therefore assuming the ejector jack 32 is being pressurized, movement of either the apron or bowl spool valve is ineffective for changing the associated jack since all of the hydraulic fluid is being diverted by spool valve 42 to the jack 32.

The operation of this system is as follows:

Assuming the bowl, apron and ejector are in the positions as shown in FIG. 1 and the operator desires to raise the apron, he would move the lever A to the "R" (Raise) position so as to shift the air control valve in the air selector mechanism 6 to provide communication between lines 140 and 54 and thereby pressurize air chamber 46. Inasmuch as line 64 and air chamber 56 were vented when the lever was in a neutral position, the pressurized air in chamber 46 acts against spool valve 38 and moves it to the right of neutral-hold as limited by the spring mechanism 44 as seen in FIG. 5. As mentioned previously, in this position of spool valve 38, pressurized hydraulic fluid is routed through port 168, line 174 to the piston rod end of the jack 26 so as to contract the latter and raise the apron 22. In order to lower the apron under power, it should be apparent that the lever A is moved through the neutral position to the P.D. (Power-Down) position to pressurize air chamber 70. The spool valve 38 then moves to the left of neutral hold as indicated in FIG. 6 due to the piston 66 contacting the end portion of the spool valve and moving the latter to a point as limited by the stop member. In this position, port 176 is pressurized while port 168 is vented so as to cause extension of the jack 26.

In addition to the two operating positions of spool valve 38, it is possible with this arrangement to have the spool valve 38 assume a float position so that the apron moves from a raised to a lowered position by gravity. The latter is obtained by pressurizing the secondary chamber 72 by movement of the lever B to the "float" position. In this instance, the pressurized air acts directly against the end of the spool valve 38 to move the spool valve to the full left position, as shown in FIG. 7. In this position of the spool valve 38, the piston-rod side of the jack is vented through line 174, port 168 and discharge chamber 163 to reservoir 162. Accordingly, assuming the apron 22 is in the raised position, the venting of the piston-rod side of jack 26 permits the weight of the apron to move the latter by gravity to a lowered position.

In operating the bowl 8, the latter can be raised by moving operating lever C to the "R" (Raise) position and thereby directing pressurized air from line 140 to line 88 and 86 so as to pressurize chamber 84. In this manner, the spool valve 40 is shifted to the right, as shown in FIG. 8, and as aforedescribed, pressurized hydraulic fluid is routed to jack 20 for contracting the latter and thereby raising the bowl 8. At the same time, line 88 feeds pressurized air through the check valve 104 and line 102 to the chamber 100 to shift the piston therein to the right, as illustrated in FIG. 4. As described earlier, the check valve 104 prevents the pressurized air from returning through line 102 and therefore chamber 100 remains pressurized until such time that air control lever D is moved to the vent position. In order to lower the bowl for purposes of placing the latter in a digging position with the cutting edge 24 in engagement with the ground, the lever C is moved through N (Neutral) to the F.D. (Float Down) position so as to pressurize chamber 90 through line 92. Of course, as the lever passes neutral, both sides of spool valve 40 are vented so that spool valve 40 shifts to the left to vent the piston rod end of jack 20 via port 166 and discharge port 156. Due to the weight of the bowl, the fluid in the piston rod end of the jack 20 is pushed out therefrom and the bowl lowers by gravity to the dig position.

Inasmuch as the air originating in the air brake system of the scraper is utilized for purposes of selectively moving one of the spool valves in the valving mechanism 34 to activate the associated jacks, it should be apparent that upon failure of the air system, it would be impossible to brake the scraper in the conventional method of lowering the bowl. To provide for this contingency, however, a fail-safe feature is built into the valving mechanism 34 which includes the air operated piston housed in the air chamber 100. Thus, assuming that the air brake system has failed and the scraper unit is moving forwardly, the scraper operator need only shift lever C past the F.D. (Float Down) position to the "B" (Brake) position so as to pivot the linkage 108 about the pivot point 114 and shift the lever D to the "V" (Vent) position so as to vent chamber 100 through line 102 and 106. As seen in FIG. 9, as chamber 100 is vented, the spring 122 then acts against the piston head 116, shifting it to the left so as to extend the rod 118 into the chamber 90 to contact and shift the valve spool 40 to the full left or float position. Thereafter the bowl would automatically move to ground engagement as described above and result in a braking action on the scraper to bring it to a safe stop.

It should be apparent that various changes and modifications can be made in the above-described system without departing from the spirit of the invention. Such changes and modifications are contemplated by the inventor and, therefore, it should be understood that he does not wish to be limited in any manner except by the scope of the appended claims.

I claim:

1. In a scraper unit the combination of a prime mover and a transportable bowl, said bowl supported for movement between a raised carry position and a lowered digging position, a hydraulic jack for operating said bowl between said positions, wheels on said prime mover and bowl, an air brake system for said wheels including a source of compressed air, a hydraulic circuit for operating the jack and having a hydraulic control unit for regulating fluid flow to and from said jack, said control unit comprising a housing having a spool valve reciprocably disposed therein and adapted to assume an operating position and an intermediate hold position and a float position, means for normally locating said valve in said intermediate hold position, air chambers respectively formed in said housing at opposite ends of said spool, means for selectively connecting said chambers with said source of compressed air for moving the spool valve to said operating and float positions, means disposed adjacent one of said air chambers and having an actuator adapted to extend into said one of said air chambers to move the spool valve to the float position, means for holding the actuator in a retracted position during normal operation of said scraper unit and means including a manually operable means for causing the actuator to extend into the adjacent air chamber to move the spool valve to the float position to cause the bowl to move to a digging position and brake the scraper unit in the event that the source of compressed air should fail.

2. In a scraper unit the combination of a prime mover and a transportable bowl, said bowl supported for movement between a raised carry position and a lowered digging position, a hydraulic jack for operating said bowl between said positions, wheels on said prime mover and bowl, an air brake system for said wheels including a source of compressed air, a hydraulic circuit for operating the jack and having a hydraulic control unit for regulating fluid flow to and from said jack, said control unit comprising a housing having a spool valve reciprocably disposed therein and adapted to assume an operating position and an intermediate hold position and a float position, first means for normally locating said valve in said intermediate hold position, first and second air chambers respectively formed in said housing at opposite ends of said spool, second means for connecting said chambers with said source of compressed air for selectively moving the spool valve to said operating and float positions, a third air chamber disposed adjacent one of said air chambers, third means disposed in the third chamber with a portion thereof communicating with the adjacent air chamber, a spring biasing said third means towards the spool valve, said third air chamber adapted to be pressurized to move said third means to compress the spring and remove said portion from the adjacent air chamber, and fourth means for venting said third air chamber to cause the spring to move said portion into the adjacent chamber so as to shift the spool valve to the float position.

3. In a scraper unit the combination of a prime mover and a transportable bowl, said bowl supported for movement between a raised carry position and a lower digging position, a hydraulic jack for operating said bowl between said positions, wheels on said prime mover and bowl, an air brake system for said wheels including a source of compressed air, a hydraulic circuit for operating the jack and having a hydraulic control unit for regulating fluid flow to and from said jack, said control unit comprising a housing having a spool valve reciprocably disposed therein and adapted to assume an operating position and an intermediate hold position and a float position, means for normally locating said valve in said intermediate hold position, first and second air chambers respectively formed in said housing at opposite ends of said spool, means for connecting said chambers with said source of compressed air for selectively moving the spool valve to said operating and float positions, a third air chamber disposed adjacent one of said air chambers, a piston having a rod extending therefrom and slidably disposed in the third chamber with the rod thereof communicating with the adjacent air chamber, a spring biasing said rod towards the spool valve, said third air chamber adapted to be pressurized to move the piston to compress the spring and remove the rod from the adjacent air chamber, and means for venting said third air chamber to cause the spring to move the piston rod into the adjacent chamber so as to shift the spool valve to the float position.

4. In a scraper unit the combination of a prime mover and a transportable bowl, said bowl supported for movement between a raised carry position and a lowered digging position, a hydraulic jack for operating said bowl between said positions, wheels on said prime mover and bowl, an air brake system for said wheels including a source of compressed air, a hydraulic circuit for operating the jack and having a hydaulic control unit for regulating fluid flow to and from said jack, said control unit comprising a housing having a spool valve reciprocably disposed therein and adapted to assume an operating position and an intermediate hold position and a float position, means for normally locating said valve in said intermediate hold position, first and second air chambers respectively formed in said housing at opposite ends of said spool, means for connecting said chambers with said source of compressed air for selectively moving the spool valve to said operating and float positions, a third air chamber disposed adjacent one of said air chambers, a piston having a rod extending therefrom and slidably disposed in the third chamber with the rod thereof communicating with the adjacent air chamber, a spring biasing said rod towards the spool valve, said third air chamber adapted to be pressurized to move the piston to compress the spring and remove the rod from the adjacent air chamber, a check valve operatively associated with the third chamber for maintaining pressurization thereof, and means for venting said third air chamber to cause the spring to move the piston rod into the adjacent chamber so as to shift the spool valve to the float position.

5. In a scraper unit the combination of a prime mover and a transportable bowl having an open end, an apron pivotally mounted to the bowl and movable between a raised and lowered position to respectively open and close the open end of the bowl, a double-acting jack for operating the apron, a hydraulic circuit for a regulating fluid flow to and from the jack, a hydraulic control unit in said circuit comprising a housing having a valve spool reciprocably disposed therein and adapted to assume two operating positions and an intermediate hold position and a float position, a source of pressurized air, first and second air chambers respectively formed in said housing at opposite ends of said spool, first means for directing pressurized air from said source to one of said chambers to move said spool to one of said operating positions, second means engaging said valve spool for normally locating said valve spool in said intermediate hold position, one of said air chambers having a piston therein for dividing said chamber into a primary air chamber connected to said first means and a secondary air chamber, said piston operatively associated with the valve spool so that pressurized air admitted into said primary chamber by said first means causes the piston to move the valve spool to one of said operating positions, and means for admitting pressurized air into said secondary chamber whereby the valve spool is moved to the float position.

6. In a scraper unit the combination of a prime mover and a transportable bowl having an open end, an apron pivotally mounted to the bowl and movable between a raised and lowered position to respectively open and close the open end of the bowl, a double-acting jack for operating the apron, a hydraulic circuit for regulating fluid flow to and from the jack, a hydraulic control unit in said circuit comprising a housing having a valve spool reciprocably disposed therein and adapted to assume two operating positions and an intermediate hold position and a float position, a source of pressurized air, separate air chambers formed in said housing at opposite ends of said spool, said chambers adapted to alternately receive pressurized air from said source to move said spool to one of said operating positions, means engaging said valve spool for normally locating said valve spool in said intermediate hold position, one of said air chambers having a piston therein for dividing said chamber into a primary and secondary air chamber, said piston operatively associated with the valve spool so that pressurized air admitted into said primary chamber causes the piston to move the valve spool to one of said operating positions and pressurized air admitted into said secondary chamber moves the valve spool to the float position.

7. A hydraulic control unit for regulating fluid flow to and from a hydraulic jack, said control unit comprising a housing having a valve spool reciprocably disposed therein and adapted to assume an operating position and an intermediate hold position and a float position, means for normally locating said valve in said intermediate hold position, a source of compressed air, first and second air chambers respectively formed in said housing at opposite ends of said spool, means for selectively connecting said first and second chambers with said source of compressed air for respectively moving the spool valve to said operating and float positions, a third air chamber disposed adjacent said second air chamber, a piston having a rod extending therefrom and slidably disposed in the third chamber with the rod thereof communicating with the second air chamber, resilient means biasing said piston rod towards the spool valve, said third air chamber adapted to be pressurized to more the piston to compress the resilient means and remove the rod from the adjacent second air chamber, and means for venting said third air chamber to cause the resilient means to move the piston rod into the second air chamber so as to shift the spool valve to the float position.

8. A hydraulic control unit for regulating fluid flow to and from a hydraulic jack, said control unit comprising a housing having a spool valve reciprocably disposed therein and adapted to assume an operating position and an intermediate hold position and a float position, means for normally locating said valve in said intermediate hold position, a source of compressed air, first and second air chambers respectively formed in said housing at opposite ends of said spool, means for selectively connecting said first and second air chambers with said source of compressed air for respectively moving the spool valve to said operating and float positions, a third air chamber disposed adjacent said second air chamber, a piston having a rod extending therefrom and slidably disposed in the third chamber with the rod thereof communicating with the second air chamber, a spring biasing said piston rod towards the spool valve, said third air chamber adapted to be pressurized to move the piston to compress the spring and remove the rod from the second air chamber, and means for venting said third air chamber to cause the spring to move the piston rod into the second chamber so as to shift the spool valve to the float position.

9. A hydraulic control unit for regulating fluid flow to and from a hydraulic jack, said control unit comprising a housing having a valve spool reciprocably disposed therein and adapted to assume an operating position and an intermediate hold position and a float position, means for normally locating said valve in said intermediate hold position, a source of compressed air, first and second air chambers respectively formed in said housing at opposite ends of said spool, means for selectively connecting said first and second air chambers with said source of compressed air for selectively moving the spool valve to said operating and float positions respectively, means disposed adjacent said second air chamber and having an actuator adapted to extend into the second chamber to move the spool valve to the float position, means for holding the actuator in a retracted position, and means including manually operable means for causing the actuator to extend into the second air chamber to move the spool valve to the float position.

10. A hydraulic control unit for regulating fluid flow to and from a hydraulic jack, said control unit comprising a housing having a valve spool reciprocably disposed therein and adapted to assume an operating position and an intermediate hold position and a float position, means for normally locating said valve in said intermediate hold position, a source of compressed air, first and second air chambers respectively formed in said housing at opposite ends of said spool, means for selectively connecting said first and second air chambers with said source of compressed air for moving the spool valve to said operating and float positions respectively, a third air chamber disposed adjacent said second air chamber, a means disposed in the third chamber with a portion thereof communicating with the second air chamber, a spring biasing said last-mentioned means towards the spool valve, said third air chamber adapted to be pressurized to move the last-mentioned means to compress the spring and remove said portion from the adjacent air chamber, and means for venting said third air chamber to cause the spring to move the said portion into the second chamber so as to shift the spool valve to the float position.

References Cited by the Examiner

UNITED STATES PATENTS

| | | |
|---|---|---|
| 1,787,328 | 12/30 | Schottler. |
| 2,157,240 | 5/39 | Keel. |
| 2,284,413 | 5/42 | Frentzel. |
| 2,870,789 | 1/59 | Bilaisis _____ 137—622 |
| 2,897,613 | 8/59 | Davidson. |
| 2,916,050 | 12/59 | Ruhl. |
| 2,946,144 | 7/60 | Anderson. |
| 2,949,097 | 8/60 | Vander Kaay. |

FOREIGN PATENTS 301,531  11/17  Germany.

BENJAMIN HERSH, *Primary Examiner.*